United States Patent
Kawamura et al.

(10) Patent No.: US 7,172,741 B2
(45) Date of Patent: Feb. 6, 2007

(54) METHOD FOR REPROCESSING SPENT NUCLEAR FUEL

(75) Inventors: Fumio Kawamura, Mito (JP); Kuniyoshi Hoshino, Mito (JP); Masakatsu Aoi, Hitachinaka (JP); Akira Sasahira, Hitachi (JP); Osamu Amano, Shiroi (JP); Hiroaki Kobayashi, Hachioji (JP)

(73) Assignees: Hitachi, Ltd., Tokyo (JP); Tokyo Electric Power Co., Inc., Tokyo (JP)

( * ) Notice: Subject to any disclaimer, the term of this patent is extended or adjusted under 35 U.S.C. 154(b) by 423 days.

(21) Appl. No.: 10/761,432

(22) Filed: Jan. 22, 2004

(65) Prior Publication Data

US 2004/0170550 A1 Sep. 2, 2004

(30) Foreign Application Priority Data

Jan. 28, 2003 (JP) ............................. 2003-018522

(51) Int. Cl.
*C01G 43/00* (2006.01)
*C01G 56/00* (2006.01)

(52) U.S. Cl. ............................. 423/19; 423/1; 423/251; 423/253

(58) Field of Classification Search .................... 423/1, 423/14, 19, 251, 253
See application file for complete search history.

(56) References Cited

U.S. PATENT DOCUMENTS 3,708,568 A * 1/1973 Golliher et al. .................. 423/6
3,753,920 A * 8/1973 Anastasia et al. ............ 252/643
2002/0122762 A1* 9/2002 Fukasawa et al. ........... 423/300
2004/0201002 A1* 10/2004 Caranoni et al. ........... 252/643

FOREIGN PATENT DOCUMENTS

JP P2000-284089 A 10/2000
JP P2002-257980 A 9/2002

OTHER PUBLICATIONS

*Nuclear Chemical Engineering*, Second Edition, edited by M. Benedict, et al., translated by Ryohei Kiyose, Chapter 10, pp. 457-564.
Aoji, T., et al. "Dry Reprocessing Process, Development History and Current Status" Nuclear power industry (Gensiryoku-Kogyo), issued by the Nikkan Kogyo Shinbun-sha (daily industrial newspaper office), Nov. 19, 2002, vol. 17, No. 3.

* cited by examiner

*Primary Examiner*—Steven Bos
*Assistant Examiner*—James Fiorito
(74) *Attorney, Agent, or Firm*—McDermott Will & Emery LLP

(57) ABSTRACT

It is an object to increase a reprocessing speed of spent nuclear fuel and to obtain uranium having a high purity and a plutonium mixture reusable as it is at a low cost through a simple procedure.

The spent nuclear fuel 1 is subjected to fluorination using fluorine 2 in a fluorination step 3, and as a result, uranium, a mixture of uranium and plutonium and a fission product are separated and recovered independently of one another. The plutonium fluoride volatilized in the fluorination is recovered along with a fixing agent and then passed through an oxidative conversion step 8, thereby recovering a mixture of uranium and plutonium oxides 9. Since the uranium can be recovered in a high purity, it is managed very easily when reused or saved. Further, since the uranium and plutonium are recovered as a mixture thereof, fuel reproduction cost is decreased and prevention of proliferation is strengthened.

12 Claims, 6 Drawing Sheets

METHOD FOR REPROCESSING SPENT NUCLEAR FUEL

FIELD OF THE INVENTION

The present invention relates to a method for reprocessing spent nuclear fuel. Particularly, the present invention related to a method suitably used for recovering uranium and plutonium through reprocessing of the spent nuclear fuel generated from nuclear power plants or the like by utilizing difference in volatility of their fluorides.

BACKGROUND OF THE INVENTION

Purex process of an aqueous process has been extensively used as a method for reprocessing spent nuclear fuel. According to the Purex process, the spent nuclear fuel is dissolved in nitric acid, and the nitric acid solution obtained is subjected to extraction with an organic solvent such as tributyl phosphate, thereby recovering uranium (U) and plutonium (Pu) (for example, refer to "Nuclear Chemical Engineering (separate volume IV) Chemical Engineering for Fuel Reprocessing and Radioactive Wastes Management", edited by M. Benedict, et al., translated by Ryohei Kiyose, issued by the Nikkan Kogyo Shinbun-sha (daily industrial newspaper office), Dec. 29, 1983, pages 18 to 90).

As a dry process using no aqueous solution, two kinds of molten salt electrolysis processes have been developed. One of them is called Russian process and another is called ANL process. Both processes are named for a development country and a development organization, respectively. According to the Russian process, oxide fuel is melted in a molten salt of a chloride to deposit a U oxide on an electrode and precipitate a Pu oxide, thereby recovering both. According to the ANL process, metal fuel as it is or that obtained through prior reduction of oxide fuel into metal fuel is melted in a molten salt of a chloride, thereby recovering metal U and metal Pu on different electrodes, respectively.

As a dry reprocessing process other than the molten salt electrolysis processes, there is known a fluoride volatility process, in which reprocessing is effected making use of difference in volatility of fluorides. According to a known fluoride volatility process, U and Pu are recovered in a high purity making the most use of techniques such as distillation, partial condensation, adsorption and the like (for example, refer to "Nuclear power industry (Gensiryoku-Kogyo)", issued by the Nikkan Kogyo Shinbun-sha (daily industrial newspaper office), Nov. 19, 2002, Vol. 17, No. 3, pages 53 to 58).

There is a process intended to improve said fluoride volatility process, wherein fluorination conditions are varied at the time of fluorination to carry out the fluorination one after another. According to the process, a uranium fluoride and a mixture of a uranium fluoride and a plutonium fluoride are recovered in a manner such that the former is in a high purity and the latter is in a low purity. Thereby, it is attempted to strength proliferation resistance and to increase an economical advantage due to omission of any purification step (for example, refer to JP-A-2000-284089).

Further, as a combination of the dry process and the aqueous process, there is a process, wherein the fluoride volatility process is combined with the Purex process. According to said combination process, it is attempted to recover U and a mixture of U and Pu to a high purity, and at the same time it is attempted to obtain an economical advantage due to miniaturization of devices (for example, refer to JP-A-2002-257980).

SUMMARY OF THE INVENTION

It is said that the Purex process, one of methods for reprocessing the spent nuclear fuel, has problems such that the process is an aqueous solution system and uses an organic solvent, so that criticality control becomes sever, the solvent is easily decomposed and deteriorated by the action of radiation, and moreover the quantities of wastes are relatively large.

On the other hand, it is said that the problems of criticality and deterioration due to radiation can be easily avoided according to the dry process using neither aqueous solution nor organic solvent. However, any dry process is a developing technology. Namely, the Russian process dealing with the oxide fuel has problems to be solved such that the U product is low in its purity and the salt wastes are difficult to be treated.

The ANL process mainly dealing with the metal fuel has problems such that an additional step of reduction into metal is required for reprocessing the oxide fuel that is the main current in this country, and moreover the process has problems of purity of the U product, treatment of salt wastes, processing speed to be improved and so on.

The known fluoride volatility process, which is a dry process other than the molten salt electrolysis processes, has problems such that steps become complex in order to recover Pu to a high purity, and a recovery rate is decreased due to decomposition of the Pu fluoride during the Pu purification procedure.

According to the improved fluoride volatility process disclosed in the above JP-A-2000-284089, it is attempted to avoid and solve the problems of the Pu decomposition in the above known fluoride volatility process. However, it is somewhat troublesome to operate devices for the fluorination, because the fluorinations are planned so as to be carried out one after another.

The process combining the dry and aqueous processes as disclosed in the above JP-A-2002-257980 is superior from the viewpoint that the product can be obtained to a high purity, and particularly a mixture of the U oxide and the Pu oxide can be obtained. However, such process has problems such that two kinds of utilities are required for treating the wastes due to combination of both processes different in their theories, namely a dry system and an aqueous system.

An object of the present invention is to provide a method for reprocessing spent nuclear fuel, according to which a reprocessing rate can be improved, and uranium having a high purity and a mixture of uranium and plutonium reusable as it is can be obtained at a low cost through a simple procedure.

The aforementioned object can be accomplished by providing a method for reprocessing spent nuclear fuel, which comprises a fluorination step of applying fluorine to spent nuclear fuel powder to cause volatilization and a removal step of removing a plutonium fluoride from fluorides volatilized in the foregoing fluorination step.

More specifically, the object can be accomplished by providing a method for reprocessing spent nuclear fuel, which comprises a fluorination step of applying fluorine to spent nuclear fuel powder obtained through decladding of spent nuclear fuel to cause volatilization, a fixation step of fixing a plutonium fluoride among fluorides volatilized in the foregoing fluorination step, a step of refining a uranium fluoride, a removal step of removing the aforementioned fixed plutonium fluoride, and an oxidative conversion step of applying water vapor and hydrogen to the removed plutonium fluoride, thereby converting the fluoride into its oxide.

Further, the object can be also accomplished by providing a method for reprocessing spent nuclear fuel, which comprises a re-fluorination step of applying fluorine to the plutonium fluoride removed in the foregoing plutonium fluoride removal step to cause re-fluorination and a gas phase hydrolysis step of applying water vapor and hydrogen to the gaseous plutonium fluoride obtained through re-fluorination in the re-fluorination step, thereby converting the fluoride into its oxide.

Considering an application where the products (U and Pu) obtained after reprocessing of the spent nuclear fuel are reused as fuel, it is necessary that the product U is high in a refining degree. On the other hand, with respect to the Pu, it is permitted that Pu is low in its refining degree. One reason thereof is as follows. In a reactor wherein the Pu fuel is used, for example, in a new type reactor including a light-water reactor for a plutonium thermal use, a fast breeder reactor and a reduced moderation water reactor, it is permitted to use vibro-packing fuel, which is preferred to obtain an economical advantage relating to the fuel production. Another reason thereof is as follows. It is rather desired that Pu is low in its refining degree from the viewpoint of proliferation resistance.

According to the reprocessing method in accordance with the present invention, it becomes possible to recover U having a high refining degree, a mixture of U and Pu having a low refining degree and a fission product (FP) independently of one another.

The reprocessing method in accordance with the present invention is summarized as follows.

In a process wherein fluorine is applied to the spent nuclear fuel, the spent nuclear fuel is formed into powder prior to supply to the fluorination step. In the fluorination step, the reaction with fluorine gas is carried out in a reactor, for example, in a so-called flame reactor, while emitting the nuclear fuel powder in the jet form. Thereby, both the U and Pu in the nuclear fuel are converted into volatile hexafluorides, which volatilize in the gaseous form.

These gases are passed through an adsorption tower filled with an adsorbing agent as a fixing agent for recovering the Pu, thereby fixing the Pu fluoride only. The hexafluoride of U is passed through the tower. The hexafluoride of U can be easily refined with the aid of an adsorbing agent such as sodium fluoride as used in a known fluoride volatilization process, and as a result, a decontamination factor (DF) reaches $10^7$ (for example, refer to Journal of the Atomic Energy Society of Japan, vol. 9, No. 9, pages from 530).

Thereby, the subject of recovering U to a high refining degree with use of a compact equipment can be solved. The U refined in such a manner is present in a chemical form of $UF_6$. The refined U can be directly applied to a U enrichment step. Alternatively, even in a series of processing relating to reuse of the U, it can be formulated into pellet fuel in a conventional U fuel production plant. Further, if desired, it is also possible for the refined U to be stored or saved due to its high refining degree.

On the other hand, the Pu adsorbed and fixed in the Pu recovery adsorption tower is present in a solid form of $PuF_4$. The $PuF_4$ is taken out therefrom along with the fixing agent, and then subjected to oxidative conversion using water vapor and hydrogen in the successive oxidative conversion step, thereby obtaining a Pu oxide in a powder or particle form. At this time, a U fluoride, $UO_2F_2$, can be used as the adsorbing agent for the Pu fixing use. Thereby, $PuF_6$ volatilized from the fluorination device (for example, a flame reactor) can be selectively adsorbed, whereas the $UF_6$ volatilized therefrom is freed from adsorption.

In short, a mixture of U and Pu oxides can be obtained in the oxidative conversion step by using $UO_2F_2$ as the adsorbing agent. The mixture of oxides in the form of powder or particle obtained after the oxidative conversion can be formed into a granule having a predetermined particle diameter through operations such as granulation and then supplied as a material for vibro-packing fuel.

With respect to $PuF_4$ adsorbed in the Pu recovery adsorption tower, an alternative procedure can be applied in place of the foregoing procedure wherein the $PuF_4$ is taken out with the adsorbing agent and then subjected to oxidative conversion in the successive oxidative conversion step. Namely, a mixture of the $PuF_4$ and $UO_2F_2$ is subjected to re-fluorination to produce gaseous fluorides of U and Pu. The $UF_6$ and $PuF_6$, which are volatilized from a re-fluorination device (for example, a flame reactor), are subjected to hydrolysis using water vapor and hydrogen, in other words, both are subjected to so-called gas phase hydrolysis, thereby obtaining U and Pu oxides in the particle form. According to this alternative procedure, the mixture of U and Pu oxides obtained in the particle form without any granulation operation can be supplied as a material for vibro-packing fuel.

Most of the fission product (FP), which is freed from volatilization in the fluorination step and deposited on the bottom of the fluorination device or the flame reactor in the form of a fluoride or an oxide, is taken out and then subjected to solidification treatment as a high-level waste.

Other objects, features and advantages of the invention will become apparent from the following description of the embodiments of the invention taken in conjunction with the accompanying drawings.

Figure 1:
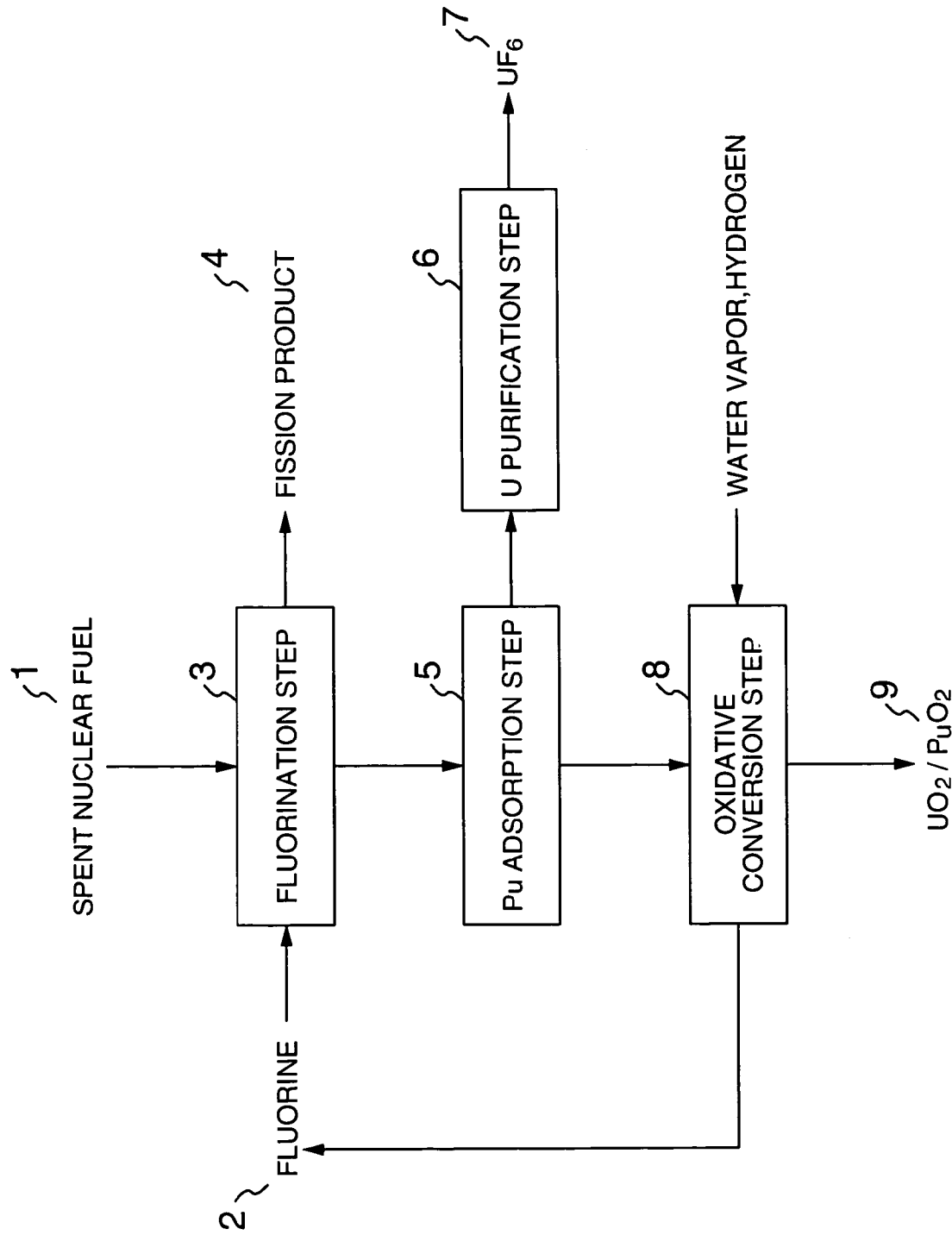
FIG. 1 is a figure showing a basic mode for carrying out the present invention.

These diagrams comprise spent nuclear fuel 1, fluorine 2, fluorination step 3, fission product 4, Pu adsorption step 5, U refining step 6 (i.e., U purification step 6), $UF_6$ 7, oxidative conversion step 8, $UO_2/PuO_2$ 9, hydrogen 10, thermal cracking reactor 11, re-fluorination step 14 and gas phase hydrolysis step 15.

DETAILED DESCRIPTION OF THE INVENTION

A mode for carrying out the present invention is summarized as follows. The spent nuclear fuel powder is allowed to react with fluorine gas, thereby converting the U and Pu present in the nuclear fuel into volatile gases of their hexafluorides, and the Pu hexafluoride only is fixed and separated from those gases, whereas the U hexafluoride is freed from fixation and refined as it is.

The solid Pu fluoride taken out is subjected to oxidative conversion, thereby obtaining its oxide powder or particle. The powder or particle can be formed into a granule having a predetermined particle diameter, which can be supplied as a material suitable for vibro-packing fuel. Alternatively, it is permitted that the solid Pu fluoride mentioned above is subjected to re-fluorination, and then the resulting gaseous Pu fluoride is subjected to gas phase hydrolysis, thereby obtaining its oxide in a powder form, which may be filled as it is in a fuel cladding tube as a material suitable for the vibration assisted filling fuel (i.e., vibro-packing fuel). Respective modes for carrying out the present invention are illustrated with reference to figures as follows.

[Mode 1]

Mode 1, which is a basic reprocessing method for reprocessing the spent nuclear fuel in accordance with the present invention, is explained with reference to FIG. 1. The spent nuclear fuel powder 1, which has been separated from a fuel cladding tube, in a word, the decladding spent nuclear fuel powder 1, is subjected to fluorination in the fluorination step (or device, hereafter referred to in a similar manner) 3, while supplying the fluorine gas 2.

The volatilized hexafluorides, $UF_6$ and $PuF_6$, are introduced in the Pu adsorption step (or device) 5, and the $PuF_6$ is adsorption-fixed in the form of $PuF_4$ with the aid of an adsorbing agent. The $UF_6$ is passed through the Pu adsorption device 5 and refined in the U refining step 6. As a result, it is recovered as $UF_6$ (symbol 7).

With respect to the U, it is effective to store the $UF_6$ as it is in a cylinder or the like when re-enriched, and it is effective to convert it into its oxide when not re-enriched or used as a material for fuel.

The $PuF_4$ adsorbed in the Pu adsorption device is taken out along with the adsorbing agent, and then converted into its oxide, $PuO_2$, in the oxidative conversion device 8, while supplying water vapor and hydrogen 10. It is possible to reuse the fluorine generated in the oxidative conversion device.

At this time, when $UO_2F_2$ is used as the adsorbing agent, the mixture of oxides, $UO_2/PuO_2$, which is shown by a symbol 9, is recovered. The $PuO_2$ or the mixture of oxides can be used as a material suitable for mixed oxide fuel (MOX). The fission product 4 remaining in the fluorination device 3 is treated in a waste treatment step.

According to the present Mode, using only the fluorination device 3 and the Pu adsorption device 5, the U, the mixture of U and Pu and the fission product can be recovered independently of one another from the spent nuclear fuel. As a result, there is given the effect of permitting simplification of a reprocessing system and decrease in construction and operation costs of reprocessing plants. Since the reprocessing system is simple, a place where wastes such as fission products and the like are generated can be restricted. Moreover since the fluorine gas or the like is recycled and reused, the quantities of radioactive wastes can be decreased.

The U recovered is high in its refining degree, so that re-enrichment, storing and saving, and production of U fuel pellet can be facilitated. The mixture of U and Pu contains fission products as an impurity, and therefore there is given the effect of strengthening prevention of proliferation, and moreover the mixture is applicable to a material for vibration assisted filling fuel, which is said to be low in a fuel production cost.

[Mode 2]

Figure 2:
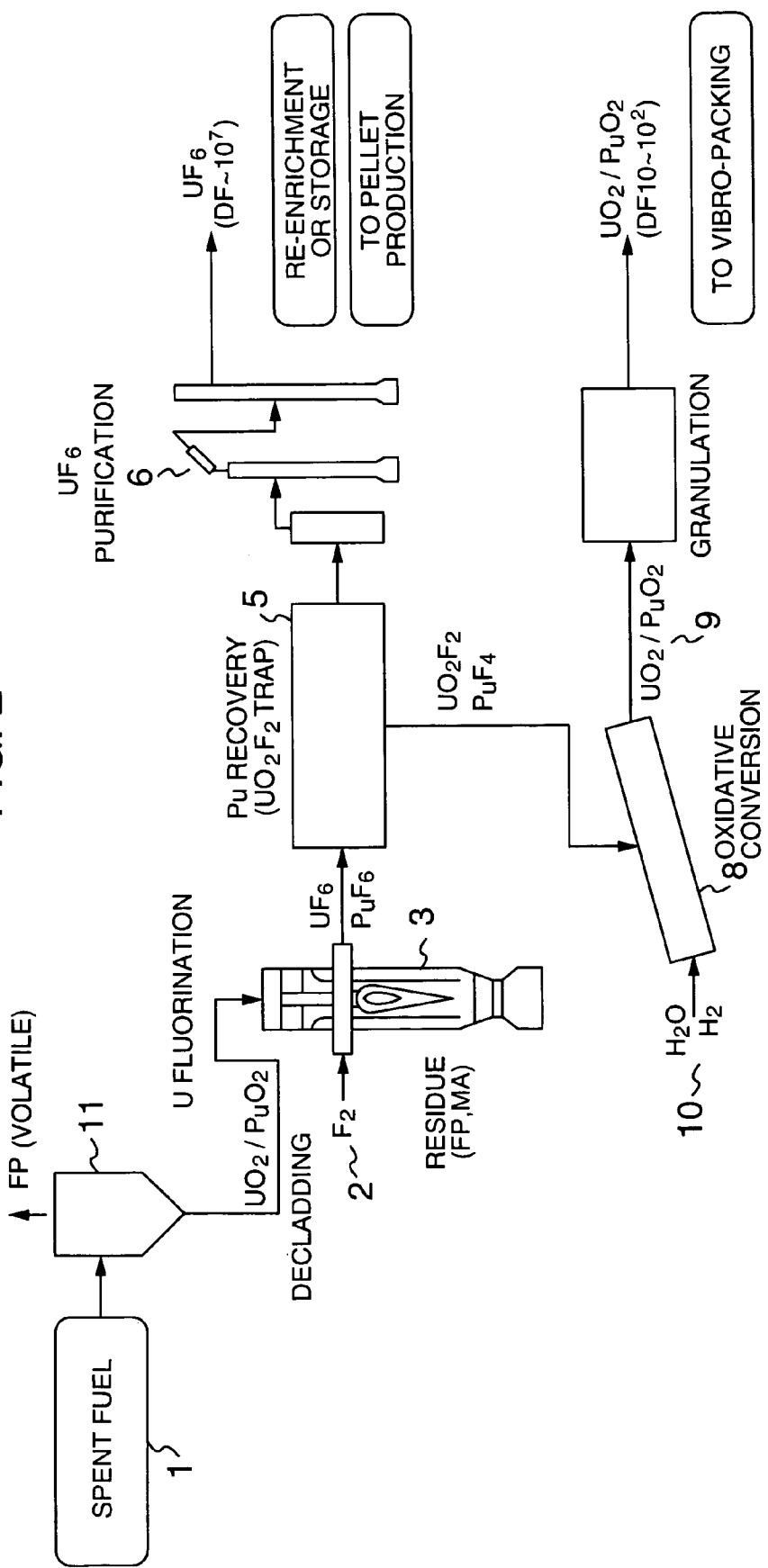
FIG. 2 is a composition diagram showing reprocessing devices used in a method for reprocessing spent nuclear fuel, which method is one of preferred modes for carrying out the present invention.

Mode 2 for carrying out the method for reprocessing the spent nuclear fuel in accordance with the present invention is explained with reference to FIG. 2. FIG. 2 is given for illustrating the case where the spent nuclear fuel from a light-water reactor is reprocessed to recover a mixture of oxides, which can be suitably used as fuel for a fast breeder reactor.

A spent nuclear fuel rod of a light-water reactor is sheared into a predetermined length when necessary and then charged in the thermal cracking reactor 11. An oxidizing agent such as oxygen and air and a reducing agent such as hydrogen are supplied therein one after the other to vary both the crystal form and lattice constant of the nuclear fuel oxide, thereby pulverizing the nuclear fuel substance. As a result, separation from the cladding tube, namely the decladding is completed.

At this time, volatile fission products (FP) such as iodine and tritium are volatilized and removed. In order to increase the degree of pulverization and that of volatilization, it is effective to apply heat and increase an alteration number of the oxidation-reduction. The iodine volatilized is removed with the aid of a silver adsorbent or the like, and the pulverized nuclear fuel substance is transferred to a flame reactor, which is the fluorination device 3.

The nuclear fuel substance transferred to the flame reactor 3 is subjected to fluorination in a manner similar to that of Mode 1. That is, fluorine gas is supplied thereto, then the U is volatilized in the form of $UF_6$, and the Pu is volatilized in the form of $PuF_6$. At this time, the amount of fluorine to be supplied is controlled, thereby completing the fluorination and volatilization of all of the U and all of the Pu at the same time.

Although nuclear species other than the U and Pu such as neptunium (Np) and technetium (Tc) are partially converted into their volatile fluorides and volatilized, those are removed in the refining system 6 mentioned below. The $UF_6$ and $PuF_6$ volatilized through the fluorination are passed through the Pu recovery trap 5 filled with $UO_2F_2$ in the particle form, and as a result, the $PuF_6$ is adsorbed in the $UO_2F_2$ in the form of $PuF_4$ and then separated therefrom.

The $UF_6$ is not adsorbed but passed through as it is, and refined in the $UF_6$ refining system 6 to the degree of $DF10^7$, while the accompanying volatile fluorides of the fission products, which have been volatilized in the fluorination device 3, are removed in an adsorption tower comprising an adsorbing agent such as NaF, $MgF_2$ and LiF. The $UF_6$ is refined to have a DF of about $10^7$. The refined $UF_6$ is saved in a cylinder or transferred to a re-enrichment step or a fuel production step.

The FP removed in the course of the uranium refining is managed as a high-level waste together with the FP removed in the other steps. The $PuF_4$ adsorbed in the Pu recovery trap 5 is recovered along with the adsorbing agent, $UO_2F_2$, after once stopping an operation before exceeding an adsorption capacity, and then transferred to the successive oxidative conversion device 8.

The oxidative conversion device 8 is a rotary kiln type. From the upper part thereof, the $UO_2F_2$ and $PuF_4$ in the powder form are supplied therein and from the lower part thereof, a mixed gas of water vapor and hydrogen is supplied therein. Thereby, a mixture of the oxides, $UO_2$ and $PuO_2$, in the powder form is obtained through oxidative conversion. At this time, a flow rate of the supplied gas, a composition thereof and the reaction time can be controlled to regulate a particle size of the mixture of oxides.

The mixture of these U and Pu oxides in the form of fuel particles is subjected to granulation operation when necessary, thereby regulating the particle diameter, transferred to a fuel production step and then formed again into fuel through vibration assisted filling. The fluorine-containing gas generated at the time of conversion into the mixture of oxides can be recycled and reused as the fluorinating agent.

Finally, a nonvolatile FP remains in the flame reactor 3 as a high-level waste. Since almost all elements thereof remain in the form of fluorides, or partially oxides or metals, the FP is mixed with another FP generated in other steps and then compression-molded as it is. Alternatively, said FP is subjected to glass-solidification, ceramic-solidification or artificial rock-solidification, thereby molding into a waste article to be disposed of. As a result, the FP can be stored or disposed of without anxiety.

According to the present Mode mentioned above, using a simple system of only the thermal cracking reactor, the flame reactor, the adsorption tower and the oxidative conversion tower, the U, the mixture of U and Pu and the FP can be recovered independently of one another from the spent nuclear fuel. As a result, there is given the effect of permitting decrease in construction and operation costs of reprocessing plants. Since the reprocessing system is simplified and fluorine gas or the like is recycled and reused, the quantities of radioactive wastes can be decreased.

The U recovered becomes high in its purity through the refining step, so that there is given the effect of facilitating storing and saving, re-enrichment and production of fuel (pellet). Further, the mixture of U and Pu contains relatively many kinds of impurity nuclear species in a relatively large amount, so that there is also given the effect of preventing proliferation (for example, diversion into nuclear weapons). Moreover, the fuel is finely divided with the aid of the thermal cracking reactor, and as a result, the fluorination of U and that of the mixture of U and Pu can be facilitated to increase a recovery rate of the nuclear fuel substance.

The mixture of U and Pu oxides obtained in the oxidative conversion tower is left as it is and used as fuel for vibration assisted filling, and as a result, the recovery rate of the nuclear fuel substance, particularly the recovery rate of Pu can be increased. At this time, there is given the effect that the fuel production cost can be decreased, because it is not necessary to intentionally produce a material for the vibration assisted filling.

[Mode 3]

Figure 3:
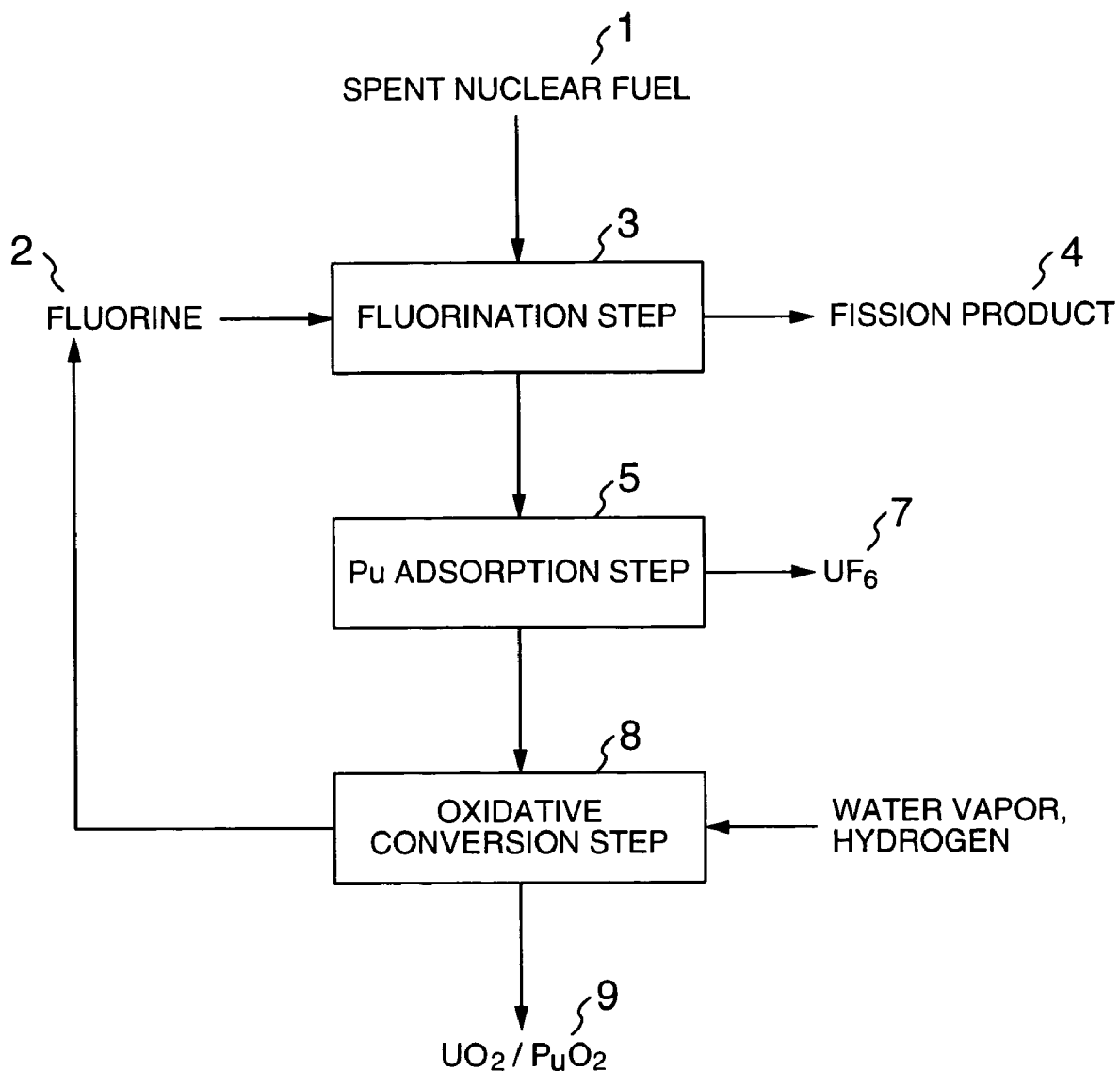
FIG. 3 is a composition diagram showing reprocessing devices used in a method for reprocessing spent nuclear fuel, which method is the other of preferred modes for carrying out the present invention.

Mode 3 for carrying out the method for reprocessing spent nuclear fuel in accordance with the present invention is explained with reference to FIG. 3. Components of FIG. 3 are those constituted by subtracting the U refining device from those of FIG. 1. According to said components, the U product becomes low in its refining degree. When a U fuel having a low DF is received in a blanket and so on like in a fast breeder reactor, the reprocessing steps can be further simplified to decrease a reprocessing cost.

[Mode 4]

Figure 4:
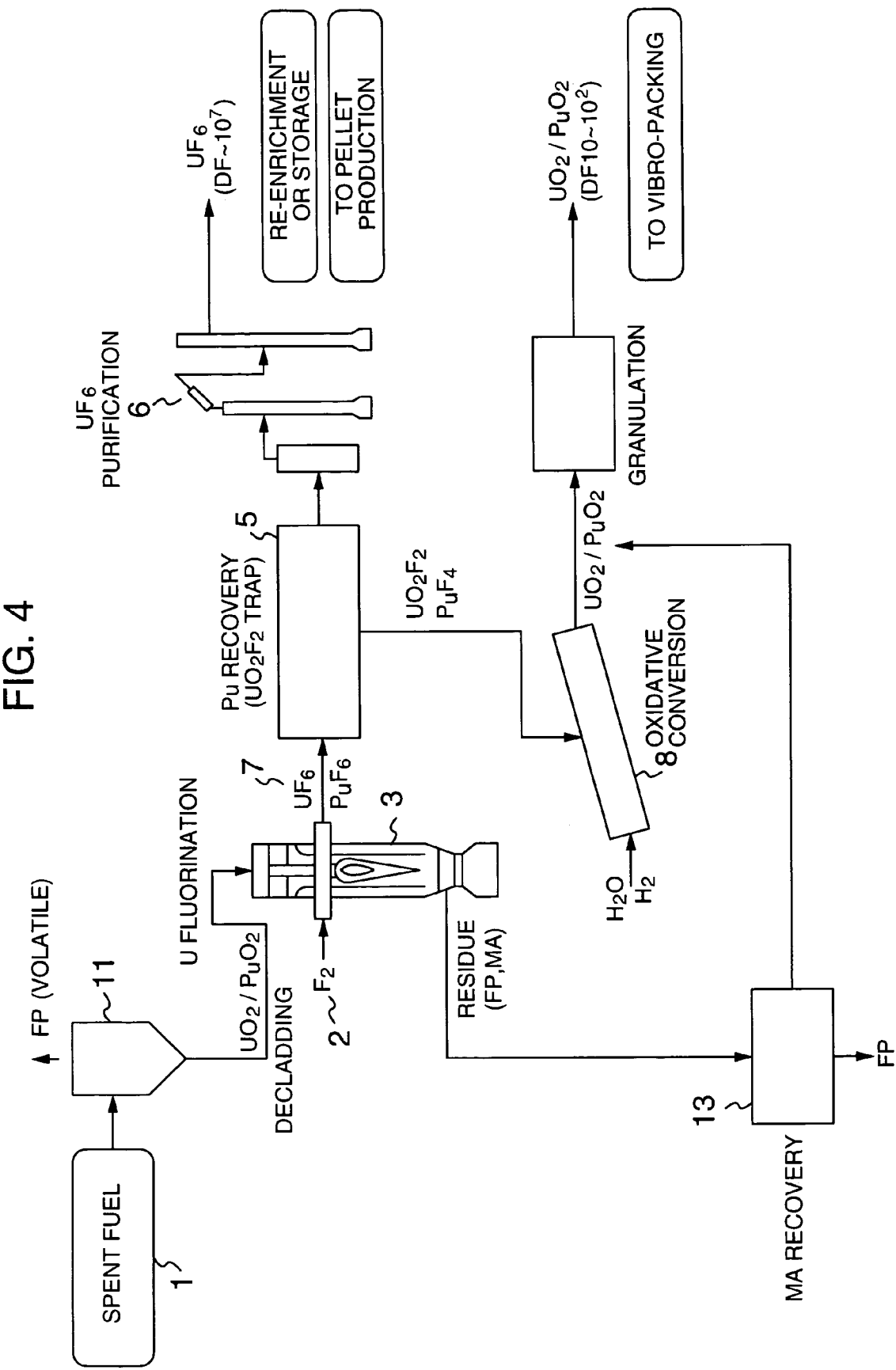
FIG. 4 is a composition diagram showing reprocessing devices used in a method for reprocessing spent nuclear fuel, which method is a third one of preferred modes for carrying out the present invention.

Mode 4 for carrying out the method for reprocessing spent nuclear fuel in accordance with the present invention is explained with reference to FIG. 4. Components of FIG. 4 are those constituted by adding a minor actinoids (MA) recovery step 13 to those of FIG. 2. According to said components, americium (Am) and curium (Cm), which are the MA of long-term half-life nuclear species, can be separated and recovered from the FP remaining in the flame reactor. Those MA can be mixed with the mixture of oxides and burnt when used in a fast breeder reactor. At the same time, no long-term half-life nuclear species is contained in a high-level waste, so that there is given the effect of mitigating the burden of management.

[Mode 5]

Figure 5:
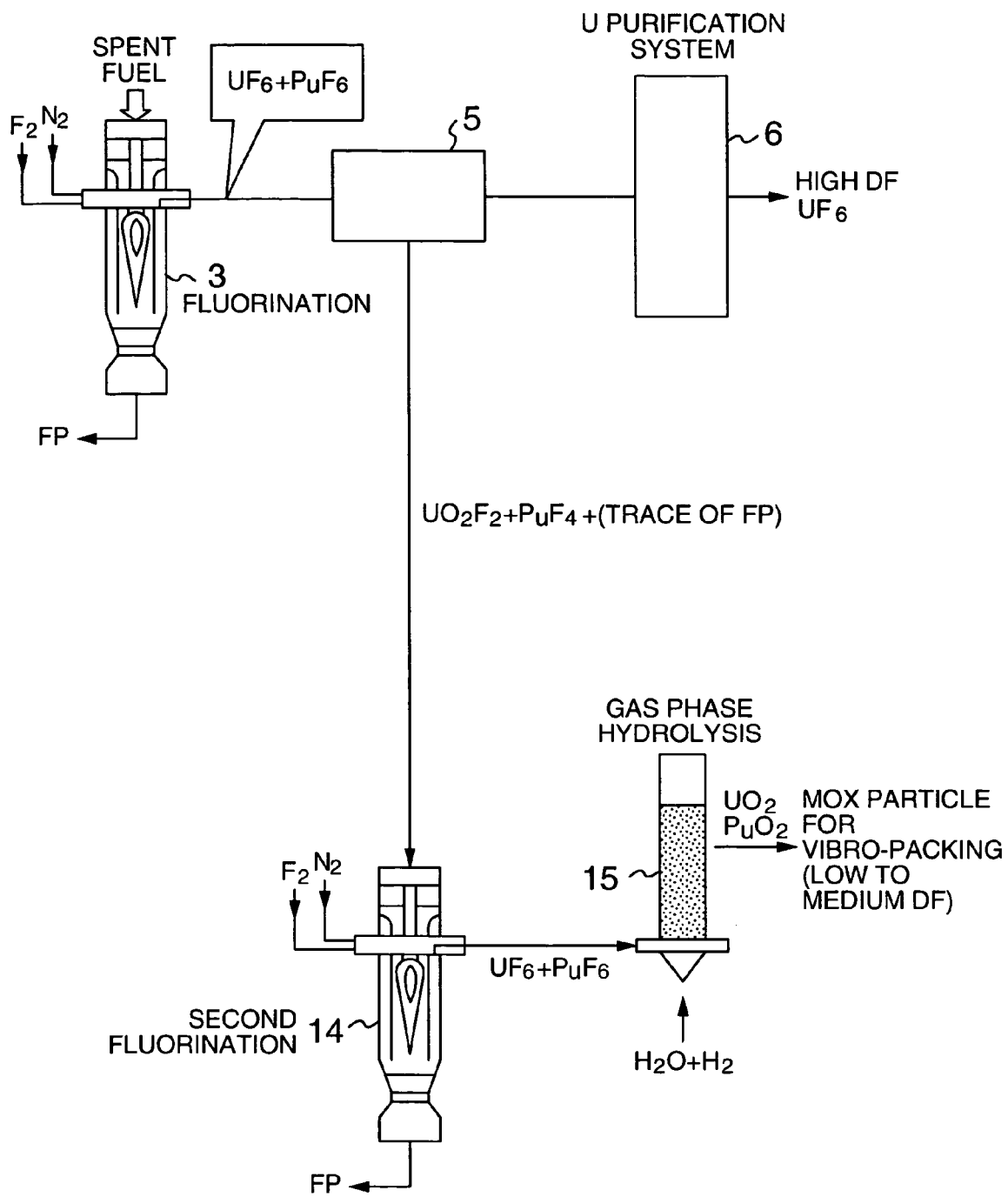
FIG. 5 is a composition diagram showing reprocessing devices used in a method for reprocessing spent nuclear fuel, which method is a fourth one of preferred modes for carrying out the present invention.

Another mode for carrying out the method for reprocessing spent nuclear fuel in accordance with the present invention is explained with reference to FIG. 5. The spent nuclear fuel 1 is subjected to decladding, and thereafter fluorination is carried out in the fluorination device 3, while supplying the fluorine gas 2. The volatilized hexafluorides, $UF_6$ and $PuF_6$, are introduced in the Pu adsorption device 5 filled with $UO_2F_2$, wherein the $PuF_6$ is adsorbed and fixed in the form of $PuF_4$ with the aid of said adsorbing agent. The $UF_6$ is passed through the Pu adsorption device 5, refined in the U refining device 6 and then recovered as the $UF_6$ 7.

With respect to the U, it is effective to save and store the $UF_6$ as it is in a cylinder or the like when re-enriched, and it is effective to convert it into its oxide when not re-enriched or used as a material for fuel. The $PuF_4$ adsorbed in the Pu adsorption device 5 is taken off along with said adsorbing agent, $UO_2F_2$. These solid fluorides of U and Pu are regulated in their particle diameters through a pulverization step or the like when necessary, and again subjected to fluorination through a second fluorination step in the fluorination device 14, while supplying the fluorine gas 2.

The volatilized hexafluorides, $UF_6$ and $PuF_6$, are transferred to the successive gas phase hydrolysis step (device) 15. The gas phase hydrolysis device is a fluid bed type. A solid particle (for example, $UO_2$ or the like), which serves as a nucleus at the time of hydrolysis, is added therein in advance as a fluidized medium, and water vapor and hydrogen 10 are supplied therein. In the gas phase hydrolysis device 15, the gaseous $UF_6$ and $PuF_6$ are directly hydrolyzed on the surface of said solid particle serving as a nucleus, thereby obtaining and recovering the mixture of oxides, $UO_2/PuO_2$ (symbol 9). The mixture of oxides is used as a material for mixed oxide fuel (MOX). The fission product 4 remaining in the fluorination devices 3 and 14 is treated through a waste treatment step.

Here, it is permitted to use the fluorination device 3 in which the first fluorination is carried out also as the re-fluorination device 14 in which the second fluorination is carried out. In general, however, it is recommended that respective fluorination devices depending upon handling amounts be arranged. The reason is as follows. In general, the amounts of the material to be supplied to the fluorination devices for both the first fluorination and the second fluorination are greatly different from each other when the spent nuclear fuel of a light-water reactor is processed, and the amount of the latter is less, namely about from ⅕ (one-fifth) to 1/10 (one-tenth) times that of the former. Nevertheless, it is possible to use a device making serve the double purpose.

According to the present Mode mentioned above, the U, the mixture of U and Pu and the fission products can be separated and recovered independently of one another from the spent nuclear fuel. As a result, there is given the effect of permitting simplification of the reprocessing system and decrease in construction and operation costs of reprocessing plants. The reprocessing system is simplified, so that a place at which wastes such as fission products are generated is restricted. Moreover, fluorine gas or the like is recycled and re-used, so that the quantities of radioactive wastes can be decreased.

The U recovered is high in its purity, and therefore there can be given the effect of facilitating re-enrichment, storing and saving and production of the U pellet fuel. The mixture of U and Pu contains fission products as impurities, and therefore there is also given the effect of preventing proliferation. Moreover, because of the particle form, the mixture can be supplied as it is without granulation as a low cost fuel capable of filling in a fuel cladding tube through vibration assisted filling.

[Mode 6]

Figure 6:
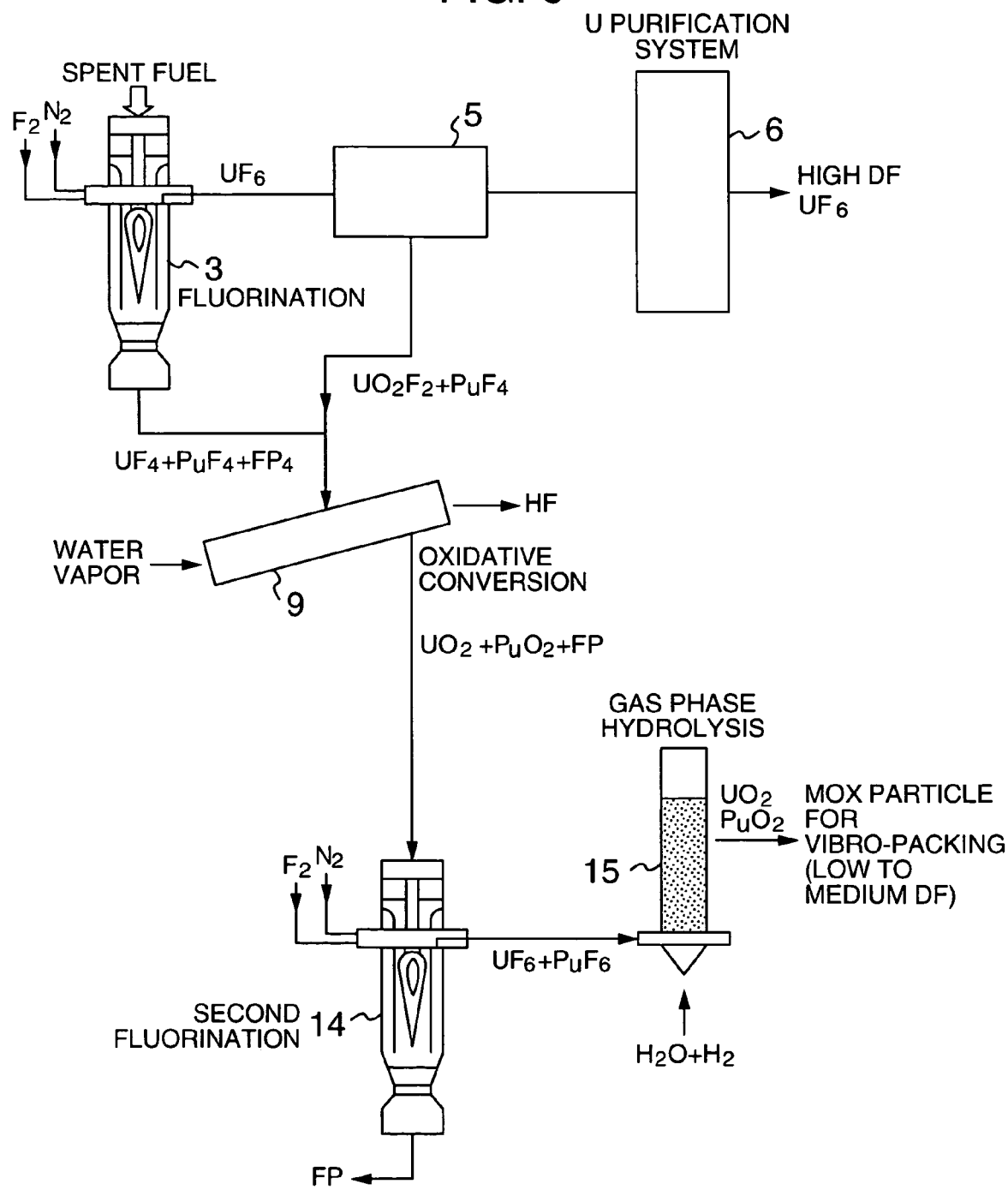
FIG. 6 is a composition diagram showing reprocessing devices used in a method for reprocessing spent nuclear fuel, which method is a fifth one of preferred modes for carrying out the present invention.

A mode for carrying out the method for reprocessing spent nuclear fuel in accordance with the present invention is explained with reference to FIG. 6. Components of FIG. 6 are those constituted by adding an oxidative conversion step between two fluorination steps to those of FIG. 5. Even according to said components, almost the same effects as in FIG. 5 can be obtained.

The spent nuclear fuel rod is sheared in a predetermined length when necessary, and thereafter subjected to decladding. The pulverized nuclear fuel substance is transferred to the flame reactor 3, which is a fluorination device. The nuclear fuel substance transferred to the flame reactor 3 is subjected to fluorination in a manner similar to that of the other mode mentioned above. By controlling the supplying amounts and concentrations of the fluorine gas, almost 90% or more of the U is volatilized in the form of $UF_6$.

With respect to the Pu, the flame reactor is operated, so that the Pu remains in the form of a solid $PuF_4$ at a tower bottom of the flame reactor With respect to the $UF_6$, $UF_6$ is volatiled by the fluorination device 3 in the refining system 6 and the accompanying volatile fluorides of fission products are removed in an adsorption tower comprising an adsorbing agent such as NaF, $MgF_2$ and LiF, and as a result, the $UF_6$ is refined to the degree of about DF $10^7$. The refined $UF_6$ is saved in a cylinder or transferred to a step of re-enrichment or fuel production.

On the other hand, the $PuF_4$ remaining at the tower bottom of the fluorination device (flame reactor) 3 is transferred to the successive oxidative conversion device 8 along with the FP. The oxidative conversion device is a rotary kiln type. From the upper part thereof, the FP fluorides and the $UF_4$ and $PuF_4$ powders freed from volatilization are supplied, and from the lower part thereof, a mixed gas of water vapor and hydrogen is supplied. Thereby, an oxidative conversion reaction is carried out to obtain the mixture of oxides, $UO_2$ and $PuO_2$, in the powder form. The mixture of these U and Pu oxides in the form of fuel particle is again subjected to fluorination in the fluorination device 14, while supplying the fluorine gas 2 like in Mode 5. The volatilized hexafluorides, $UF_6$ and $PuF_6$, are transferred to the successive gas phase hydrolysis step.

The gas phase hydrolysis device 15 is a fluid bed type. A solid particle (for example, $UO_2$ particles or the like), which serves as a nucleus at the time of hydrolysis, is added therein as a fluidized medium in advance, and water vapor and hydrogen 10 are supplied therein. In the gas phase hydrolysis device 15, the gaseous $UF_6$ and $PuF_6$ are directly hydrolyzed on the surface of said solid particle serving as a nucleus, thereby obtaining and recovering the mixture of oxides, $UO_2/PuO_2$ (symbol 9). The mixture of oxides is used as a material for mixed oxide fuel (MOX). The fission product 4 remaining in the fluorination devices 3 and 14 is treated through a waste treatment step.

It should be further understood by those skilled in the art that although the foregoing description has been made on embodiments of the invention, the invention is not limited thereto and various changes and modifications may be made without departing from the spirit of the invention and the scope of the appended claims.

Effects of the Invention

In carrying out the reprocessing of spent nuclear fuel in accordance with the present invention, there can be given more effects in various respects, as compared with a conventional method. That is, uranium can be recovered in a high purity from fluorides of the spent nuclear fuel, and as a result, reuse of the uranium, for example, re-enrichment thereof can be facilitated. Moreover, the uranium is freed from fission products through their removal, so that it can be extremely easily managed when saved or the like.

Further, the uranium and plutonium can be recovered as a mixture usable as a material for fuel reproduction as it is, so that a fuel reproduction cost can be decreased. Furthermore, since no high purity plutonium is dealt with singly, prevention of proliferation can be attained. Still further, devices and processing institutions can be more simplified as compared with a conventional method, and therefore an economical advantage can be increased.

What is claimed is:

1. A method for spent nuclear fuel reprocessing, which comprises a fluorination step of applying fluorine to spent nuclear fuel powder to cause volatilization and a removal step of removing a plutonium fluoride from fluorides volatilized in the foregoing fluorination step, wherein the plutonium fluoride is removed along with a fixing agent in the foregoing removal step of removing a plutonium fluoride, and wherein a uranium fluoride is used as the foregoing fixing agent used for fixing the plutonium fluoride.

2. The method for spent nuclear fuel reprocessing according to claim 1, wherein the foregoing fluorination step is carried out to cause fluorination of uranium and that of plutonium at the same time.

3. The method for spent nuclear fuel reprocessing according to claim 1, wherein the foregoing fluorination step is carried out using a flame furnace.

4. A method for spent nuclear fuel reprocessing, which comprises a fluorination step of applying fluorine to spent nuclear fuel powder to cause volatilization and a removal step of removing a plutonium fluoride from fluorides volatilized in the foregoing fluorination step, wherein the plutonium fluoride is removed along with a fixing agent in the foregoing removal step of removing a plutonium fluoride, and wherein uranyl fluoride is used as the foregoing fixing agent.

5. A method for spent nuclear fuel reprocessing, which comprises a fluorination step of applying fluorine to spent nuclear fuel powder obtained through decladding of spent nuclear fuel to cause volatilization, a fixation step of fixing a plutonium fluoride among fluorides volatilized in the foregoing fluorination step, a step of refining a uranium fluoride, a removal step of removing the aforementioned fixed plutonium fluoride, and an oxidative conversion step of applying water vapor and hydrogen to the removed plutonium fluoride, thereby converting the fluoride into its oxide, wherein both a solid plutonium fluoride and a solid fixing agent are subjected to oxidative conversion in the foregoing oxidative conversion step, thereby converting them into their oxides.

6. The method for spent nuclear fuel reprocessing according to claim 5, which further comprises a granulation step of forming the oxide powder or particle obtained in the foregoing oxidative conversion step into a granule.

7. A method for spent nuclear fuel reprocessing, which comprises a fluorination step of applying fluorine to spent nuclear fuel powder obtained through decladding of spent nuclear fuel to cause volatilization, a fixation step of fixing a plutonium fluoride among fluorides volatilized in the foregoing fluorination step, a step of refining a uranium fluoride, a removal step of removing the aforementioned fixed plutonium fluoride, a re-fluorination step of applying fluorine to the removed plutonium fluoride to cause re-fluorination, and a gas phase hydrolysis step of applying water vapor and hydrogen to the gaseous plutonium fluoride obtained through re-fluorination in the re-fluorination step, thereby converting the fluoride into its oxide, wherein both a gaseous plutonium fluoride and a gaseous fixing agent are subjected to gas phase hydrolysis in the foregoing gas phase hydrolysis step, thereby converting them into their oxides.

8. The method for spent nuclear fuel reprocessing according to claim 7, wherein the oxide particle obtained in the foregoing gas phase hydrolysis step is filled in a cladding tube without a granulation of the oxide particle.

9. The method for spent nuclear fuel reprocessing according to claim 5, wherein the uranium fluoride is refined in the form of a hexafluoride in the foregoing step of refining a uranium fluoride.

10. The method for spent nuclear fuel reprocessing according to claim 7, wherein the uranium fluoride is refined in the form of a hexafluoride in the foregoing step of refining a uranium fluoride.

11. The method for spent nuclear fuel reprocessing according to claim 4, wherein the foregoing fluorination step is carried out to cause fluorination of uranium and that of plutonium at the same time.

12. The method for spent nuclear fuel reprocessing according to claim 4, wherein the foregoing fluorination step is carried out using a flame furnace.

\* \* \* \* \*